April 11, 1972     T. C. BOHRER ET AL     3,655,857
PROCESS FOR PREPARING ACRYLONITRILE POLYMER SOLUTION
Filed Oct. 2, 1968     4 Sheets-Sheet 1

INVENTOR
THOMAS C. BOHRER
ANTONY E. CHAMP
BY *Herbert M. Adrian Jr.*
ATTORNEY

April 11, 1972   T. C. BOHRER ET AL   3,655,857
PROCESS FOR PREPARING ACRYLONITRILE POLYMER SOLUTION
Filed Oct. 2, 1968   4 Sheets-Sheet 4

INVENTORS
THOMAS C. BOHRER
ANTONY E. CHAMP
BY *Herbert M. Adrian Jr.*
ATTORNEY

United States Patent Office 3,655,857
Patented Apr. 11, 1972

---

3,655,857
PROCESS FOR PREPARING ACRYLONITRILE POLYMER SOLUTION
Thomas C. Bohrer, Summit, N.J., and Antony E. Champ, Charlotte, N.C., assignors to Celanese Corporation, New York, N.Y.
Filed Oct. 2, 1968, Ser. No. 764,380
Int. Cl. D01f 7/00
U.S. Cl. 264—206   11 Claims

ABSTRACT OF THE DISCLOSURE

A method for forming shaped articles, such as fibers, films, fibrillated films, molded products and the like, is described utilizing a solution of an acrylonitrile polymer in a low boiling solvent maintained under superatmospheric pressures. The products produced thereby are unique and, when in fiber form, the fibers possess particularly desirable properties. The process is directed to the extruding of acrylonitrile polymers at least about 85 percent acrylonitrile using acetonitrile as the solvent. The process is effected by maintaining the fiber-forming material in a liquid state under superatmospheric pressure and elevated temperatures and releasing the pressure and/or cooling on extruding through a shaped orifice. The process conditions are readily varied so that melt spun, dry spun or wet spun type results are obtained.

BACKGROUND

The present invention relates to the production of shaped articles such as fibers, films, fibrillated films, molded articles and the like extruded materials. More particularly, this invention relates to acrylonitrile polymers extruded by a novel process using a novel solvating system and to the products produced thereby, especially fibers. The high acrylonitrile polymers used herein are of at least 85 percent acrylonitrile and the solvent system used comprises acetonitrile or acrylonitrile water mixtures.

High acrylonitrile fiber-forming polymers of at least about 85 percent acrylonitrile were known for a number of years prior to the discovery of solvents for such polymers. Although a number of solvents have been discovered for this polymer, these solvents have generally had boiling temperatures in excess of about 100 degrees centigrade, and conventionally used solvents have boiling points in excess of 150 degrees centrigrade. The production of acrylic yarns of high acrylonitrile content by a dry or evaporative spinning procedure has thus previously required relatively high boiling solvents such as dimethyl formamide. Even utilizing dry spinning into hot air, the low vapor pressure of these and similar known solvents necessitated a water wash or other special solvent removal steps to remove the residual unevaporated solvent from the fiber. In commercial operations, washing results in additional steps and also largely limits the acrylics to staple fiber because of production economics induced by the washing step. Also, the use of such solvents limit drawing speeds to below spinning speeds so that for economical operation of the spinning process, the yarn usually had to be lagged or collected as spun and thereafter drawn in a separate operation.

It has recently been discovered, contrary to long held knowledge in the art, that high acrylonitrile polymers can be solvated with a low boiling solvent, particularly acetonitrile and acetonitrile-water mixtures. Although under ordinary conditions, acetonitrile and acetonitrile/water mixtures do not act as a solvent for high acrylonitrile polymers, it has been discovered that high solids content solutions can be prepared with these solvents using certain solvating techniques. The production of acetonitrile solutions of such high acrylonitrile polymers results in solutions having rather unique and unusual properties which do not readily lend themselves to the formation of shaped articles by conventional methods.

It is an object of the present invention to provide a method for the production of shaped articles from high acrylonitrile polymers using a novel low boiling solvent system. It is another object of the present invention to provide a method for spinning acrylic fibers using acetonitrile solvents by wet and dry spinning processes as well as processes which simulate melt spinning. It is a further object of this invention to provide novel high acrylo nitrile fibers having unique dyeing properties, a wool-like hand, a wide range of fiber cross-sections and optical transmission properties. These and other objects will become apparent to those skilled in the art from a description of the invention which follows.

THE INVENTION

In accordance with the invention a process is provided for the formation of shaped articles of acrylonitrile polymers comprising forming a solution of an acrylonitrile polymer of at least about 85 percent acrylonitrile by weight, in acetonitrile or acetonitrile-water mixtures, as the solvent, by heating said polymer and solvent under superatmospheric pressure to above the boiling point of said solvent to the solution temperature thereof, maintaining said solution under superatmospheric pressure and at a temperature above the gelation point of the said solution, passing said solution through a shaped orifice and releasing said superatmospheric pressure on said solution, thereby forming said solution, into a shaped article.

Fibers in this manner can be distinguished by one or more characteristics such as longitudinal serrations along the fiber length, optical transmission properties, lack of residual high boiling conventional solvents, slower dye uptake with higher dye capacity, unique cross-sections for acrylic fibers, plurality of different cross-sections in a yarn bundle and various other distinctions as will be pointed out more clearly hereinafter.

The present process provides a unique flexibility in operating conditions due in part to the conditions under which the polymer is retained in liquid form and the peculiar characteristics of the polymer-solvent solution. Solutions of the polymer readily solidify on the changing of either of two conditions under which the solution is retained prior to shaping. These solidification conditions are (1) the lowering of the temperature to the gelation point, which is normally near the boiling point of the solvent whereupon a gel is formed, or (2) the release of the superatmospheric pressure under which the polymer solution is retained whereupon solvent is evaporated leaving a solidified polymer. The first condition does not depend on evaporation of solvent to effect the gelation but rather the fact that the solvent used is not a solvent for high acrylic polymers under normal conditions.

Various combinations of these solidification conditions can be utilized in the spinning operation to produce a wide variety of fibers having a wide variety of cross sections and other desirable physical properties. For instance, by extruding into a gas at a temperature below the gelation temperature of the dope or polymer solution, melt spinning type conditions can be simulated such that the fiber takes on a cross section approximating the cross section of the orifice through which it is spun. By utilizing higher temperatures, that is above the gelation point of the solvent, and by varying the temperature into which the polymer is extruded, cross sections varying from crenulated to dog-bone are readily obtained.

It will be readily recognized that in utilizing a solvent of high vapor pressure, the removal of the solvent from the extruded article is more readily and conveniently effected without special washing and/or extraction steps.

The present process further incorporates great flexibility into processing conditions because extremely high solids concentrations can be incorporated into the spinning composition. For instance, solid contents of about 30 up to about 70 percent by weight can be used. This factor, in combination with the high volatility of the solvent, permits the production of extremely high denier fibers up to about 2,000 denier per filament or more to be spun while retaining the highly desired physical properties such as low void formation. These and numerous other advantages will become apparent to those skilled in the art from the further description of the invention which follows.

DETAILED DESCRIPTION

The invention will be described more fully by reference to the drawings wherein:

FIG. 3 illustrates the cross-section of serrated, dog-bone filaments;

FIG. 4 illustrates the cross-section of serrated round filaments;

FIG. 5 illustrates the cross-section of serrated, crenulated filaments.

FIG. 6 illustrates the cross-section of a bundle of varied filaments having cross-sections ranging from H-shaped to irregular multilobal;

FIG. 7 illustrates the cross-section of another bundle of varied filaments;

FIG. 8 illustrates the cross-section of a bundle of filaments having smooth crenulated shapes; and FIG. 9 illustrates the cross-section of a bundle of smooth surface dog-bone filaments.

The process flow sheet and photographs of fiber cross-sections readily illustrate the flexibility of the present invention and the ability to produce acrylic fibers which cross-sections were previously unknown by any process for high acrylics.

Figure 2:
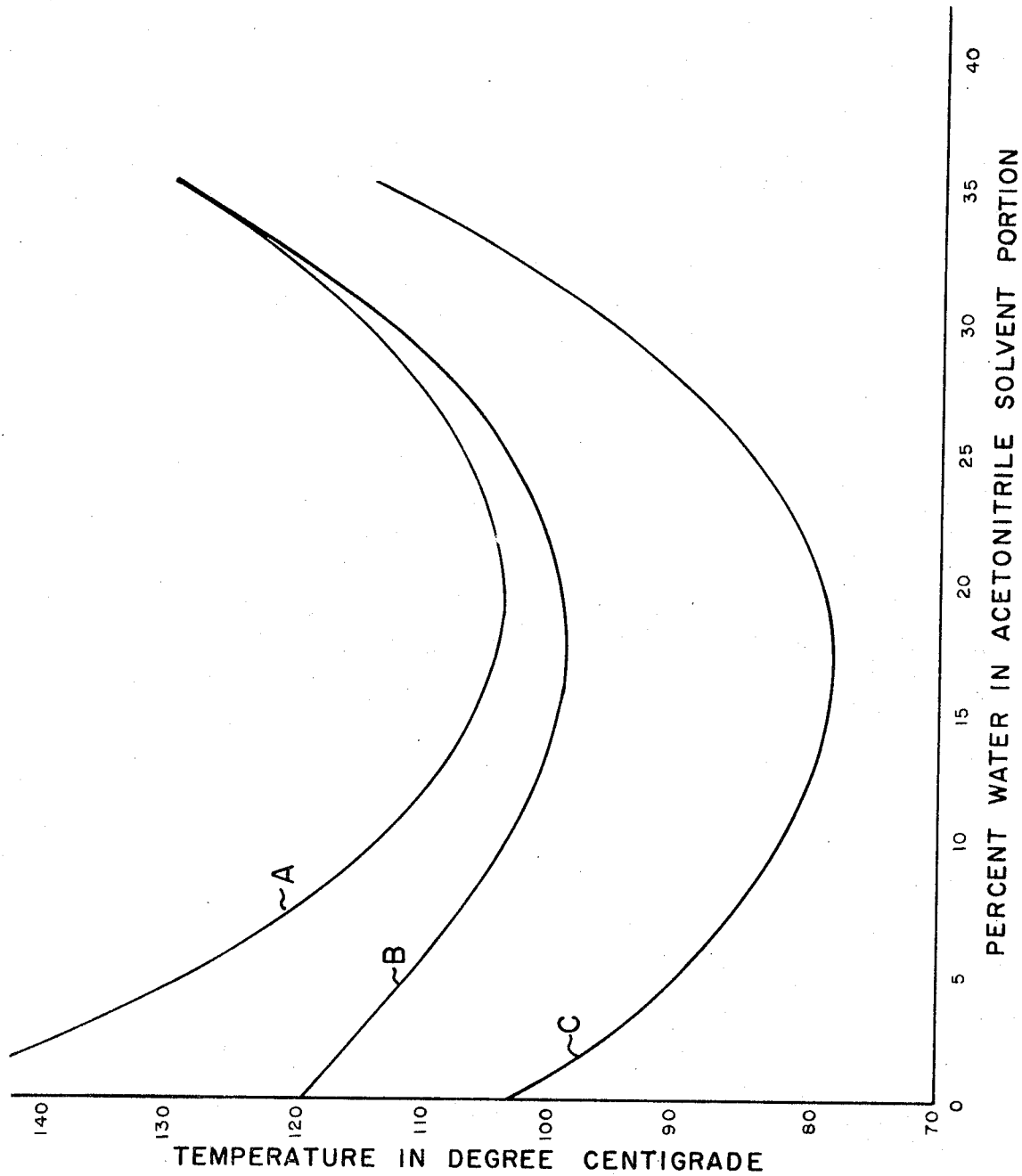
FIG. 2 is a graph illustrating the unique solution.

The process can be described specifically, by reference to FIG. 2 wherein curve A represents the initial solution temperature at which high acrylonitrile polymers e.g., at least 85 percent acrylonitrile content, dissolve in the presence of acetonitrile with varying amounts of water. Prior to forming the solution, the mixture goes through a gel formation stage at the temperature indicated at curve B. Having formed a homogeneous solution, the temperature of the solution can then be substantially reduced without gel formation to a temperature represented by curve C which indicates the gelling temperature of the solution on cooling. Thus, considerable flexibility is given to the spinning process without danger of premature gelation of the spinning solution because of the differential between initial solutioning temperature and the subsequent gelation temperature. The graph also illustrates the desirability for utilizing water as a portion of the acetonitrile solvent system to lower the solution and gelling temperature.

The noted curves in the drawing are typical for an acrylonitrile polymer comprising by weight about 95 percent acrylonitrile, 4.5 percent methyl acrylate and 0.5 percent sodium methallyl sulfonate polymerized to an intrinsic viscosity (I.V.) of 1.4 as measured in a 0.1 percent solution of dimethyl formamide at 25 degrees centigrade. The actual curves for other high acrylonitrile polymers will vary somewhat from those shown in the drawing, depending on the amount and type of material polymerized with the acrylonitrile. For instance, with acrylonitrile homopolymers, the curves are displaced to higher temperatures. With larger amounts of additives, up to about 15 percent, the curves are displaced to somewhat lower temperatures.

Because the invention is particularly applicable to high acrylonitrile polymers in low boiling solvents, it will be described hereinafter more particularly with reference to such polymers. As referred to herein, high acrylonitrile polymers are those containing at least 85 percent acrylonitrile by weight. These polymers can be acrylonitrile homopolymers as well as copolymers, terpolymers, multipolymers and the like wherein up to about 15 percent of the polymer is another ethylenically unsaturated compound copolymerizable with the acrylonitrile. Such materials can be monomers or polymers which are copolymerizable with acrylonitrile and added to modify and/or enhance certain characteristics of the acrylic polymer. Often, the material copolymerizable with the acrylonitrile contains a chemical group which increases the basic dyeability of the resulting polymer. Such dye enhancing compounds normally contain a sulfur or phosphorus group in the ethylenically unsaturated chemical entity copolymerizable with the acrylonitrile. Typically, such sulfur or phosphorus containing compounds are added in an amount of about 0.1 up to about 5 percent by weight of the total polymer composition while the other modifying substance, if any, is added in an amount of up to about 15 percent. Typical ethylenically unsaturated monomers copolymerizable with acrylonitrile are methyl acrylate, vinyl acetate, vinylidene chloride, methyl methacrylate, methallyl alcohol, vinylidene cyanide, styrene sulfonic acid materials, sodium methallyl sulfonate, mixtures and partial polymers thereof and the like as are well known to those skilled in the art. The polymers are polymerized by conventional methods such as solution or suspension polymerizations as well known in the art.

The degree to which the polymer is polymerized is dependent on the end use for which the polymer is intended. Thus, for spinning acrylic fibers, the polymer is preferably polymerized to an intrinsic viscosity of about 0.9 to 2.0 or more, and more preferably about 1.2 to 1.8. Of course, higher I.V.'s can be used but they result in higher viscosities for given solvent concentrations. For films molded products, extruded non-fiber products and the like, different I.V.'s may be more desirable.

In the solution spinning of fibers, it is preferable to use a high solids concentration in the spinning solution. With the present solvent system, such high solid concentrations are readily obtained using the acrylic polymers having I.V.'s in the normal range used for acrylic fiber spinning, that is, about 1.2 to 1.8. In particular, solutions of a solids content of about 30 to 70 percent by weight are readily obtained. The more preferred spinning solutions are obtained in the solid range of about 30 to 50 percent with polymers having I.V.'s of about 1.2 to 1.8 or more. With lower I.V. polymers, such as about 0.9 to 1.2, higher solids contents up to about 70 percent or more can be used. Because of the unique characteristics of the present solvent system wherein the solvent appears to be soluble in the polymer rather than the polymer being soluble in the solvent, special techniques are required to reduce the solids level below about that described. These techniques are, however, not pertinent to the presently described invention.

The spinning solutions are formed by mixing the desired solid portion of acrylonitrile polymer with acetonitrile by itself or with water in an amount up to about 40 percent of the total solvent portion. While a water addition need not be used, it has been found that the addition of water, particularly in the range of about 18 to 27 percent by weight of the acetonitrile solvent portion, lowers the gelation point of the resulting solution, thereby enabling greater flexibility and control of spinning, molding or extruding temperatures.

The acrylic polymer and acetonitrile solvent portions are heated under superatmospheric pressure to a temperature above about the boiling point or below the polymer degradation temperature wherein the polymer passes from a solid into a gel state and subsequently into a liquid state. Having reached the liquid state, the temperature can then be lowered without gelation over a range as indicated in the graph in FIG. 2. The gel temperature on cooling is normally above or near the boiling point of the acetonitrile, depending on the amount of water present, the polymer I.V., the acrylonitrile content, the solid content and the like.

The superatmospheric pressure utilized to form the solution is preferably at least equal to that required to maintain the acetonitrile solvent portion in substantially the liquid phase. However, higher pressures can conveniently be used but they normally are not needed.

The unique feature of the present invention which lends particular flexibility to spinning is the property of the resulting solutions to gel or set on either releasing the solvent, cooling below the gel point, which is about the solvent boiling point or a combination thereof. Thus, melt spinning characteristics can be obtained by extruding the fiber into a spinning column which is maintained at a temperature below the gelation point of the spinning solution. Dry spinning effects are otbained by extruding the solution into a column at a temperature about or above the gelation point of the solution. Wet spinning effects are obtained by spinning the solution into a coagulation bath which may be heated to control the release of solvent from the product. Dry spinning methods are generally preferred however, because of the more ready adaptation of conventional spinning equipment to the present process. Therefore, further descriptions of the present invention will be directed more particularly to dry spinning.

Various cross sections ranging from crenulated to dogbone, many of which are illustrated in the drawings, can be obtained by dry spinning by varying the spinning solution temperature, the temperature in the spinning column, the amount of solvent in the spinning column and the like techniques.

The polymer solution in the noted solvent is continually maintained, prior to extruding, under at least the autogenous pressure of the solvent at a temperature above the gel point of the solution. The gel point varies with the solvent, that is the proportion of water used with the acetonitrile, if any, and the composition of the polymer. The variations for a typical polymer are shown in FIG. 2. Thus, the polymer solution is maintained at a temperature of about 80 to 130 degrees centigrade and a corresponding pressure at least sufficient to maintain the solvent in the liquid state. This pressure is normally in the range of about 25 to 100 pounds per square inch gauge but could be higher if desired.

The release of the pressure on extruding a fiber into the column may cause gelation of the polymer even at the higher temperatures due to the cooling effect of the solvent evaporation. The speed of gelation however can be controlled by solvent content, temperature and the like properties within the column: Under certain preferred dry spinning conditions, the filaments solidify rapidly on spinning, even at very high spinning speeds such as 500 meters per minute or more such that the fibers can be touched or even pushed together without sticking or breaking at a point only a few millimeters from the spinnerette. Because of this rapid solidification, the spinning column used can be relatively short compared to those conventionally used in dry spinning. On the other hand, conventional dry spinning columns can be used without difficulty.

The present process lends itself to a wide variety of spinning speeds which can be varied as desired to produce particularly desirable effects. For instance, spinning speeds of 500 meters per minute and higher can be used with filament deniers of about 1 to 30 denier per filament. Lower and higher spinning speeds can be used with the noted denier as may be desired in the particular operation.

The ultimate spinning speed is limited only by the evaporation rate of the solvent. This rate is controlled by the column temperature, the column gaseous flow, the column geometry and the like considerations. As noted above, freshly spun fibers are very rapidly gelled even prior to solvent loss. However, for purposes of safety and subsequent processing, it is preferred to evaporate most of the solvent in the spinning column. Typically, the acetonitrile content of fibers leaving the spinning column is below about 10 percent and preferably below about 5 percent. However to achieve certain effects, the solvent content of the fiber on leaving the spinning column can be as high as 30 percent or more. Using a conventional acrylic dry spinnig column constructed for dimethylformamide solvent spinning, wherein the column temperature is about 85 degrees centigrade and the solvent system is about 20 percent water and 80 percent acetonitrile, and the spinining speed is about 200 meters per minute, 3 denier per filament fibers leaving the column contain about 3 percent residual solvent. Of this amount, the water content is less than 1 percent with the remainder being acetonitrile. The residual acetonitrile dissipates on stand for example over 24 hours or during further processing such as drawing, to result in only a trace amount e.g. less than about 0.05 percent of acetonitrile in the end product. Thus, the high solvent loss rate eliminates the need for washing steps, lagging or other methods conventionally used in acrylic processes for solvent removal. In addition, the elimination of such steps allows for economical and practical production of continuous filament yarns.

As noted above, the filament denier can be varied widely in the present process. Filaments having a denier per filament of from less than 1 up to extremely high deniers such as 2,000 denier per filament can be obtained due to the unique properties of the present spinning solvent system. For most fiber uses, deniers of about 1 to 30 denier per filament are preferred.

Figure 1:
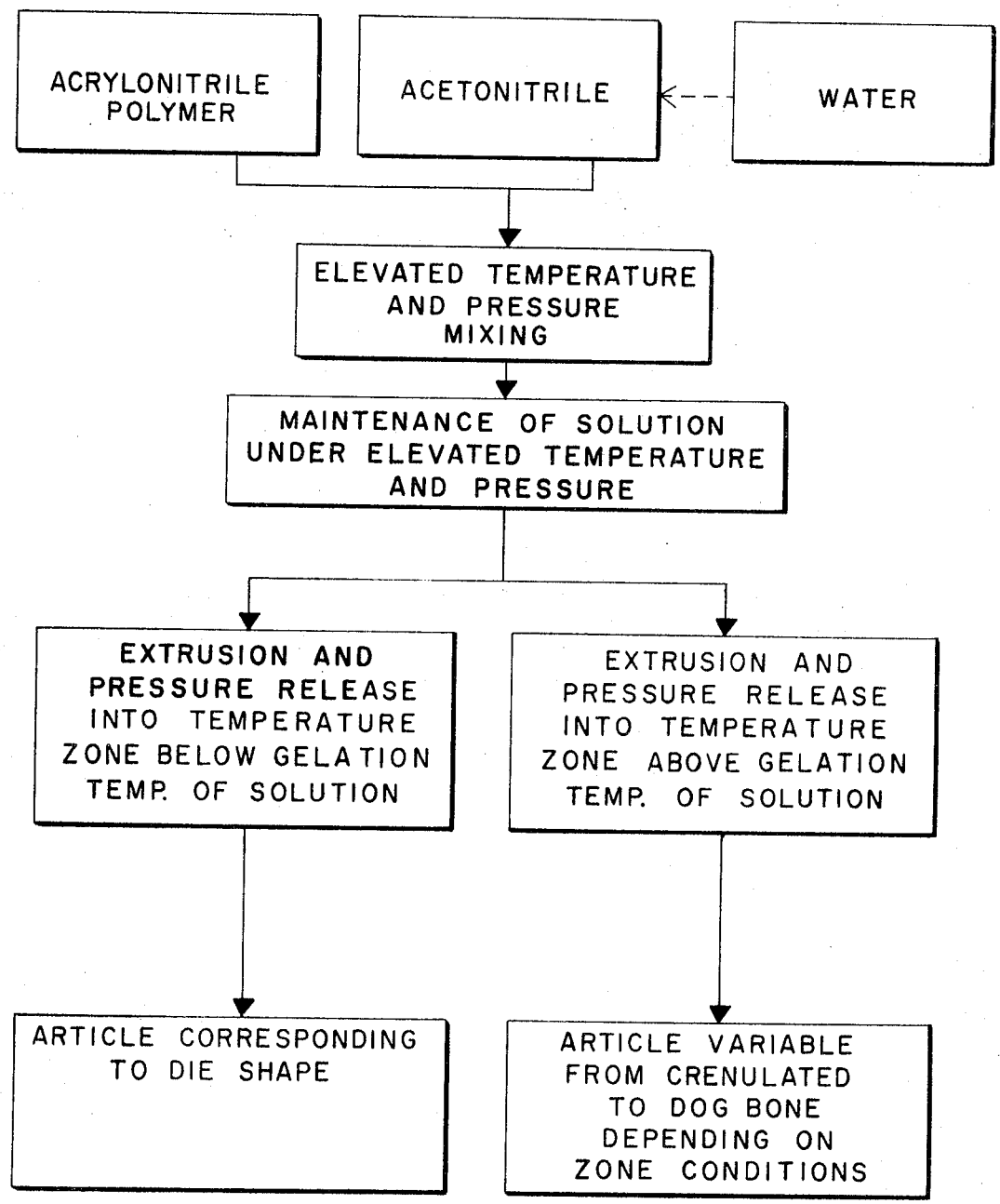
FIG. 1 is a flow sheet showing the process of the present invention.

The temperature used in the spinning column can be varied between about 140 degrees centigrade and room temperature. More preferably, the temperature is between about 30 and 130 degrees centigrade. Higher and lower temperatures can be used to accomplish special effects but generally, such temperatures are not used. The gelation point of the spinning solution, as noted in FIG. 2, is a point of reference from which variations of temperature in the spinning column generally affect the resulting fiber geometry, particularly the cross-section. At spinning column temperatures generally below the gelation temperature, the fiber tends to take on a shape corresponding to the die or spinnerette shape, as noted in FIG. 1. At higher column temperatures, the fiber geometry, particularly cross-section, can be varied into innumerable shapes as illustrated in the drawings. Serrated filaments are obtained by causing a rapid surface cooling of the filaments. The serrated filaments have a particularly desirable wool like hand and therefore they are often preferred.

Figure 6:
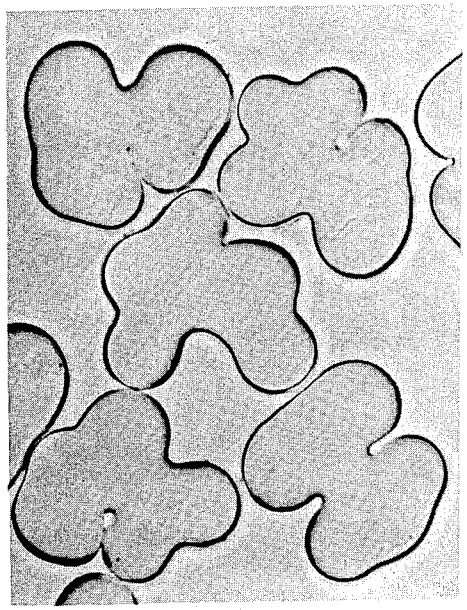
Figure 7:
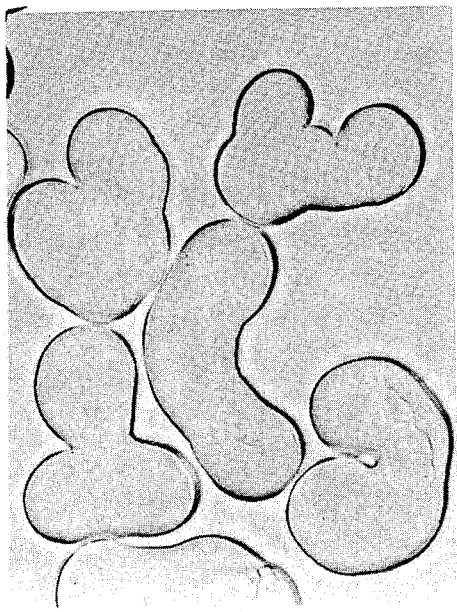
Figure 8:
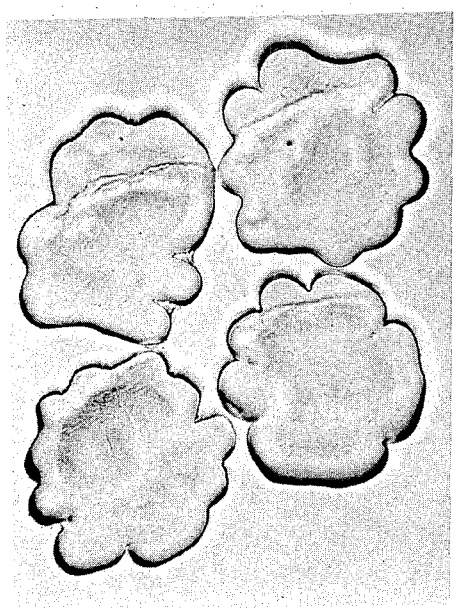
Figure 9:
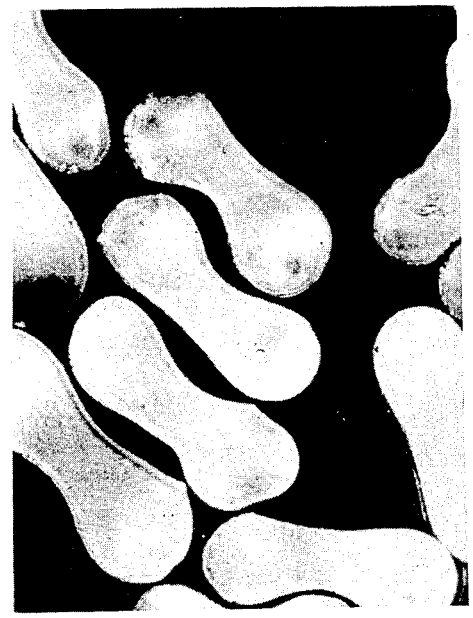

Other variations in cross-section are obtained by accurately controlling the temperature along the column length and the rate of cooling and solvent vapor concentration. This in turn controls the solvent evaporation rate and the time during which the freshly extruded fiber has to assume a change in cross sectional shape before losing its plastic state. Fiber bundles having different filament cross sections such as those illustrated in FIGS. 6, 7, and 9, are extruded from a single spinnerette have a plurality of identical jets or orifices with the cross sectional differences being affected by differential solidification and/or solvent evaporation rates from the individual extruded filaments. Small changes in temperatures, air circulation, solvent vapor concentration and combinations thereof are used to accomplish the desired result. The spin draw-down ratio (in column) can be varied from fractional to greater than unity as may be desired in the particular spinning operation.

The extruded fiber is preferably after drawn in a ratio of from about 2 to 1 to about 20 to 1 or more and more preferably in the ratio of 4 to 1 to 6 to 1. A particular advantage in the present method is that drawing speeds can be maintained at rates commensurate with the spinning speed thus eliminating the requirements of limiting spinning speeds or lagging the yarn. Conventional after drawing techniques are normally utilized such as steam drawing, heated shoe drawing and the like. The resulting fibers have typical high acrylic fiber properties such as tenacities of about 2 to 5 grams per denier or higher and elongations of about 20 to 60 percent depending on the amount of drawing. These properties can, of course, be varied to higher or lower ranges if desired.

The invention will be more fully described by reference to the following examples which illustrate certain preferred embodiments of the present invention. Unless otherwise indicated, all temperatures are in degrees centigrade and all parts are by weight in the examples and the appended claims.

Example 1

An acrylonitrile copolymer comprising about 94 percent acrylonitrile and 6 percent methyl acrylate polymerized to an intrinsic viscosity of 1.4 was formed into a spinning solution by solvating with acetonitrile and water. The spinning solution was formed by placing 20 parts of the acrylonitrile polymer into a pressure vessel together with 25.2 parts of acetonitrile and 4.8 parts of water. The mixture was then heated with mixing to a temperature of about 150 degrees centigrade under the autogeneously developed pressure of the solvent. At about 100 degrees centigrade, the material in the vessel changed from a liquid-solid phase into a gel. Continued heating to about 105 degrees centigrade produced a homogeneous fluid solution. At 120 degrees centigrade the pressure was about 40 pounds per square inch gauge. The resulting solution was comprised of 40 percent acrylonitrile polymer solids and 60 percent solvent wherein the solvent portion comprises 16 percent water and 84 percent acetonitrile by weight.

The fluid solution was stable under the developed autogenous pressure at a temperature in the range of about 80 degrss centigrade up to just below the polymer degradation temperature for long periods of time without an appreciable change in viscosity.

Figure 4:
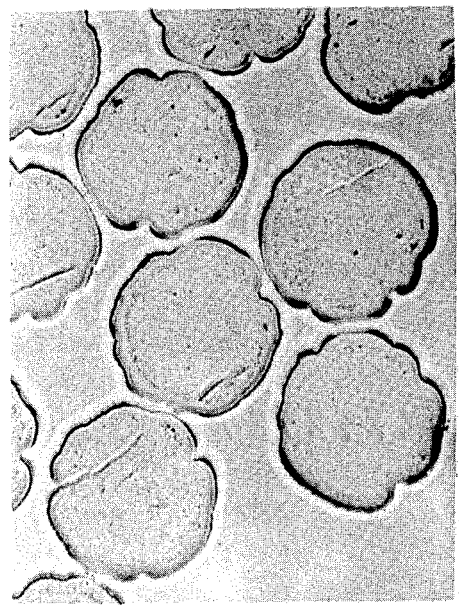

The prepared polymer solution was maintained at a temperature of about 130 degrees centigrade and a pressure of about 50 pounds per square inch gauge. Filaments were spun from the solution using 150 micron jet openings of a round configuration. The filaments were dry spun into a column maintained at a temperature of 40 to 60 degrees centigrade. The resulting filaments had round serrated cross sections as illustrated in FIG. 4.

The spun filaments were subsequently after drawn at various draw ratios between 2 to 1 to 5 to1.

Example 2

Figure 5:
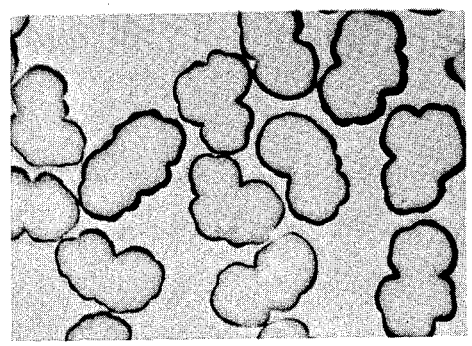

The method of Example 1 was repeated utilizing column temperatures in the range of 60 to 85 degrees centigrade. The fibers produced assumed a crenulated, serrated cross section as illustrated in FIG. 5. Again, the filaments could be drawn over a wide range of draw ratios at speeds commensurate with the spinning speed.

Example 3

An acrylonitrile polymer having an acrylonitrile content of about 95 percent, a methyl methacrylate content of about 4.5 percent and a sodium methallyl sulfonate content of about 0.5 percent polymerized to an inherent viscosity of about 1.4 as measured at 0.1 percent in dimethylformamide at 25 degrees was solvated to a solution of about 41 percent solids in accordance with the method of Example 1. The solvent ratio of acetonitrile to water was 78 percent acrylonitrile and 22 percent water. The solution was maintained at a temperature of about 125 degrees centigrade and extruded from various spinnerettes having jet hole sizes ranging from 75 microns to 150 microns. The change in jet hole size permitted changes in the final denier per filament at constant spin draw-down ratios.

Figure 3:
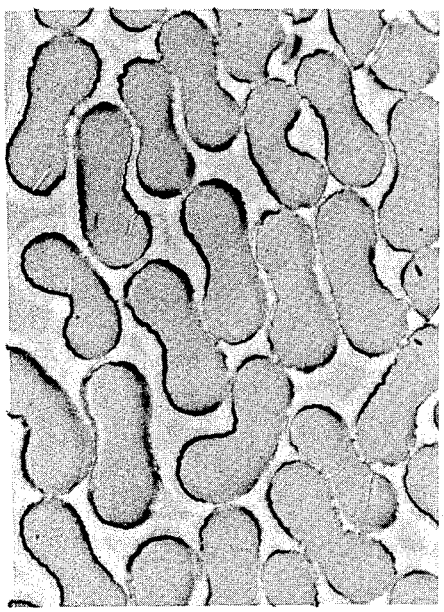
FIGS. 3 through 9 are enlarged photomicrographs of the cross-sections of various fibers spun in accordance with the present invention; more specifically.

The polymer solution was extruded into a dry spinning column wherein the air temperature at the jet level was maintained at about 95 degrees centigrade. The top column temperature was about 100 degrees centigrade and the bottom column temperature was maintained at about 125 degrees centigrade. A downdraft column air flow of about 20 cubic feet per minute was maintained within the spinning column. Filaments were spun at a rate of about 200 meters per minute. Under the noted conditions, dog-bone type cross-section filaments were produced as noted in FIG. 3. The as spun filament denier could be varied from about 7 to 75, depending on the spinnerette hole size and the particular spinning utilized. The noted denier could be readily drawn to deniers of up to about one fifth of the as spun denier per filament. Filaments exiting from the column were found to have a water content of less than 1 percent and an acetonitrile residual solvent content of about 3 percent.

By changing the column flow, the direction and/or amount, variations in the cross section could be readily obtained. For instance, by deflecting the air flow, and/or changing the column temperatures, a plurality of different cross sections could be obtained from the same spinnerette as illustrated in FIGS. 6, 7 and 9.

Evaluation of the spun and drawn filaments indicated that they have typical acrylic tensile properties. For instance, for a 5.7 denier per filament product, a tenacity of 3.5 grams per denier, an elongation of 35 percent, a tensile factor $TE^{1/2}$ (Tensile times Elongation to the 1/2 power) equal to 18 and modulus of 60 grams per denier was obtained. However, certain distinguishing characteristics of the fiber produced by the invention can be more clearly defined from similar acrylics of the same composition spun from conventional solvents such as dimethyl formamide by certain conventional and unconventional tests. In particular, the specific gravities of fibers spun according to the present invention are slightly higher, the preoxidation prior to graphitization of such fibers results in fibers of higher elongation, e.g. up to about twice similar products, and the graphitized fibers, particularly the copolymers, exhibit higher tenacities and moduli on the order of the homopolymer.

While the invention has been described more particularly with respect to the dry spinning of filaments, the method described is equally applicable to melt type and wet type spinning as well as to the extrusion of films and the production of fibrillated films, extruded products such as garden hoses, moldings and the like shaped products.

While there have been described various embodiments of the present invention, the methods and products described herein are not intended to be understood as limiting the scope of the invention as it is realized that changes therein are possible. It is intended that each element recited in any of the following claims is to be understood as referring to all equivalent elements for accomplishing substantially the same results in substantially the same or equivalent manner. It is intended to cover the invention broadly in whatever form its principles may be utilized, being limited only the appended claims.

What is claimed is:

1. A process consisting essentially of forming a solution of an acrylonitrile polymer of at least about 85 percent acrylonitrile by weight and up to about 15 percent of an ethylenically unsaturated compound copolymerizable with acrylonitrile in a mixture of acetonitrile and up to about 40% by weight of water as the solvent by heating said polymer and solvent under superatmospheric pressure to a temperature of from about 100 to 150 degrees centigrade, to form a solution.

2. The process of claim 1 wherein the superatmospheric pressure is at least about equal to the vapor pressure of the solvent at the applied temperature.

3. The process of claim 1 wherein the acrylonitrile polymer contains two different copolymerizable co-monomers in addition to the acrylonitrile and wherein one of said monomers has a sulfur-containing acid group.

4. The process of claim 1 wherein the mixture of acrylonitrile polymer, water and acetonitrile is heated to a temperature of up to about 150 degrees centigrade to solvate the same under a pressure of up to about 100 pounds per square inch gauge.

5. The process of claim 1 comprising maintaining said solution under superatmospheric pressure and at a temperature of from about 80 to 130 degrees centigrade, passing said solution through a shaped orifice into an evaporation zone maintained at a pressure below the pressure applied to said solution and releasing said superatmospheric pressure on said solution thereby forming said solution into a shaped article.

6. The process of claim 5 wherein the evaporation zone is maintained at a temperature above the boiling point of said solvent.

7. The process of claim 5 wherein the evaporation zone is maintained at a temperature below the boiling point of said solvent.

8. The method of claim 5 wherein the shaped article is a fiber and said fiber is formed by passing said solution through an orifice into a liquid coagulation zone maintained at a temperature and pressure below the temperature and pressure on said solution.

9. A process for forming a fiber consisting essentially of extruding a homogeneous solution of 30 to 70 percent by weight of an acrylonitrile polymer of at least 85 percent acrylonitrile and up to about 15 percent of an ethylenically unsaturated compound copolymerizable with acrylonitrile in a mixture of acetonitrile and water containing up to about 40 degrees by weight water into an evaporative atmosphere maintained at a temperature of from about 30 to 130 degrees centigrade, evaporating said acetonitrile and water from polymer solution to form a fiber and withdrawing said fiber from said evaporative atmosphere at an acetonitrile and water content of less than 30 percent by weight.

10. The process of claim 9 wherein the fiber withdrawn from the evaporative atmosphere has an acetonitrile and water content of less than about 3 percent.

11. The process of claim 9 wherein after standing at room temperature for at least 24 hours the acetonitrile content of the fiber is reduced to below about 0.05 percent by weight.

References Cited
UNITED STATES PATENTS

| | | | |
|---|---|---|---|
| 2,695,835 | 11/1954 | Hare | 264—206 |
| 2,706,674 | 4/1955 | Ruthrock | 264—206 |
| 2,713,041 | 7/1955 | Friedlander | 260—32.6 AO |
| 2,764,468 | 9/1956 | Hare | 264—182 |
| 2,764,469 | 9/1956 | Kowolik | 264—182 |
| 2,846,727 | 8/1958 | Bechtold | 264—182 |
| 2,862,903 | 12/1958 | Wooffon | 260—29.6 AO |
| 2,879,242 | 3/1959 | Weinstock | 260—29.6 AO |
| 3,006,715 | 10/1961 | Lyman | 264—206 |
| 3,388,202 | 6/1968 | Offenkuch | 264—206 |
| 3,402,231 | 9/1968 | Bynum et al. | 264—210 F |
| 3,081,519 | 3/1963 | Blades et al. | 264—5 |
| 3,336,428 | 8/1967 | Walter et al. | 264—185 |

JAY H. WOO, Primary Examiner

U.S. Cl. X.R.

260—29.6 AN, 29.6 AQ; 264—182